(12) United States Patent
Jung et al.

(10) Patent No.: US 9,575,326 B2
(45) Date of Patent: Feb. 21, 2017

(54) STEREOSCOPIC IMAGE DISPLAY APPARATUS

(71) Applicant: SAMSUNG DISPLAY CO., LTD., Yongin, Gyeonggi-Do (KR)

(72) Inventors: Kyungho Jung, Gyeonggi-Do (KR); Moonjung Baek, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 261 days.

(21) Appl. No.: 14/457,947

(22) Filed: Aug. 12, 2014

(65) Prior Publication Data

US 2015/0124184 A1 May 7, 2015

(30) Foreign Application Priority Data

Nov. 5, 2013 (KR) .................. 10-2013-0133747

(51) Int. Cl.
*G02F 1/1343* (2006.01)
*G02F 1/1335* (2006.01)
(Continued)

(52) U.S. Cl.
CPC ....... *G02B 27/2214* (2013.01); *G02F 1/13439* (2013.01); *G02F 1/134309* (2013.01); *G02F 1/29* (2013.01); *H04N 13/0404* (2013.01); *H04N 13/0454* (2013.01); *G02B 3/08* (2013.01); *G02F 1/1323* (2013.01); *G02F 1/1343* (2013.01); *G02F 2001/294* (2013.01)

(58) Field of Classification Search
CPC G02B 27/2214; H04N 13/0404; G02F 1/1323
See application file for complete search history.

(56) References Cited

U.S. PATENT DOCUMENTS

| 8,373,808 B2 | 2/2013 | Owaku et al. |
| 2009/0073331 A1 | 3/2009 | Shi et al. |

(Continued)

FOREIGN PATENT DOCUMENTS

| KR | 1020140102035 | 8/2014 |
| KR | 1020150048528 | 5/2015 |

OTHER PUBLICATIONS

Lei Shi, et al., "Liquid Crystal Optical Phase Plate With a Variable In-Plane Gradient," Journal of Applied Physics, 104, No. 3 (2008), pp. 033109-1-033109-7.

*Primary Examiner* — Wen-Ying P Chen
(74) *Attorney, Agent, or Firm* — F. Chau & Associates, LLC (57) ABSTRACT

An image display apparatus includes a display panel displaying an image, and a switching panel operated in a two-dimensional or three-dimensional mode. A viewer perceives the image of the display panel as a two-dimensional or three-dimensional image depending on the mode of the switching panel. The switching panel may include first and second substrates facing each other, a first electrode layer provided on the first substrate, a second electrode layer provided on the second substrate, and a liquid crystal layer interposed between the first and second substrates. One of the first and second electrode layers may include first and second electrodes provided on a specific plane, and two opposite inner sides of the first and second electrodes may be configured in such a way that lines extending therefrom converge on at least one first position.

19 Claims, 11 Drawing Sheets

(51) Int. Cl.
  *G02F 1/13*      (2006.01)
  *G02B 27/22*     (2006.01)
  *G02F 1/29*      (2006.01)
  *H04N 13/04*     (2006.01)
  *G02B 3/08*      (2006.01)

(56) References Cited

U.S. PATENT DOCUMENTS

| | | |
|---|---|---|
| 2012/0038871 A1 | 2/2012 | Inoue |
| 2012/0162550 A1* | 6/2012 | Jeong ............... H04N 13/0404 349/15 |
| 2012/0194495 A1* | 8/2012 | Kadowaki .......... G02B 27/2214 345/208 |
| 2012/0250151 A1 | 10/2012 | Lee et al. |
| 2012/0268672 A1 | 10/2012 | Sakamoto et al. |
| 2012/0268673 A1 | 10/2012 | Sakamoto et al. |
| 2013/0127831 A1 | 5/2013 | Kim et al. |
| 2013/0135545 A1 | 5/2013 | Jung et al. |
| 2013/0148043 A1 | 6/2013 | Ohyama |

\* cited by examiner

STEREOSCOPIC IMAGE DISPLAY APPARATUS

CROSS-REFERENCE TO RELATED APPLICATIONS

This U.S. non-provisional patent application claims priority under 35 U.S.C. §119 to Korean Patent Application No. 10-2013-0133747, filed on Nov. 5, 2013, in the Korean Intellectual Property Office, the entire contents of which are hereby incorporated by reference.

TECHNICAL FIELD

Example embodiments of the inventive concept relate to an image display apparatus, and in particular, to an image display apparatus capable of displaying stereoscopic or (three dimensional) 3D images.

DISCUSSION OF THE RELATED ART

An autostereoscopic display technology allows a viewer to see 3D images without the need to wear special glasses. In the autostereoscopic display technology, parallax barriers and lenticular lenses have been used in 3D imaging devices.

For the parallax barrier 3D imaging devices, a parallax barrier is disposed in front a display panel that has pixels arranged in a matrix shape. The parallax barrier has vertical-grating-shaped apertures. The parallax barrier divides a left-eye image and a right-eye image, which have a binocular disparity, such that a left eye and a right eye of a viewer respectively receive the left-eye and right-eye images and thus the viewer perceives a 3D effect.

The lenticular lens 3D image display device employees a lenticular lens sheet in place of the vertical-grating-shaped parallax barrier. The lenticular lens sheet includes semi-cylindrical lenses that are provided on the display panel and arranged along a column direction. The semi-cylindrical lenses may direct the left and right-eye images to the corresponding eyes of the viewer so that the 3D effect may be perceived.

SUMMARY

Example embodiments of the inventive concept provide a simplified fabrication process that omits an initial orientation process of a switching panel. An image display apparatus may be fabricated thereby.

According to example embodiments of the inventive concept, an image display apparatus may include a display panel displaying an image, and a switching panel operated in a two-dimensional or three-dimensional mode. A viewer may thereby be able to perceive the image of the display panel as either a two-dimensional or three-dimensional image.

The switching panel may include first and second substrates facing each other, a first electrode layer provided on the first substrate, a second electrode layer provided on the second substrate, and a liquid crystal layer interposed between the first and second substrates.

One of the first and second electrode layers may include first and second electrodes provided on a plane, and two opposite inner sides of the first and second electrodes may be configured in such a way that lines extending therefrom converge on at least one first position.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

Example embodiments of the inventive concepts will now be described more fully with reference to the accompanying drawings, in which example embodiments are shown. Example embodiments of the inventive concepts may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings may denote like elements, and thus their description will be omitted.

It should be noted that the figures are intended to illustrate the general characteristics of methods, structure and/or materials utilized in certain example embodiments and to supplement the written description provided below. These drawings might not necessarily be drawn to scale. For example, the relative thicknesses and positioning of molecules, layers, regions and/or structural elements may be reduced or exaggerated for clarity. The use of similar or identical reference numbers in the various drawings may be used to indicate the presence of a similar or identical element or feature.

It will be understood that when an element is referred to as being "connected" or "coupled" to another element, it can be directly connected or coupled to the other element or intervening elements may be present.

As discussed above, autostereoscopic 3D displays may incorporate either parallax barriers or lenticular lenses. However, exemplary embodiments of the present invention may provide for an autostereoscopic display that can be activated in either a 2D or 3D mode. Such a device may, for example, utilize lenticular lenses. In particular, a lenticular device capable of operating in 2D or 3D mode may include two substrates, a liquid crystal provided between the substrates, and electrodes provided on one of the substrates. The electrodes may allow the liquid crystal to be arranged in the form of a lenticular lens. The lenticular device may be disposed on the display panel and may be operated in 2D or 3D mode by changing voltages applied to the electrodes.

Figure 1:
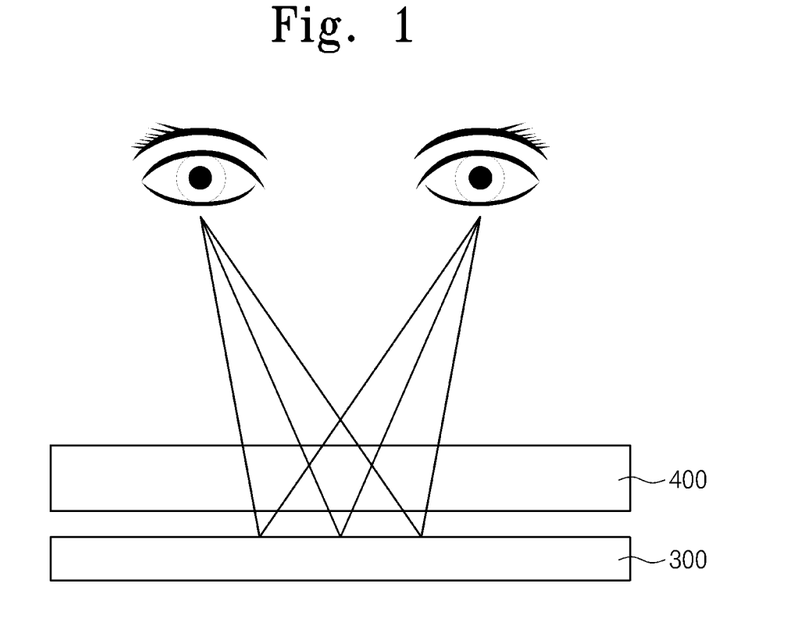
FIG. 1 is a schematic diagram illustrating a structure of an image display apparatus capable of displaying two-dimensional (2D) and three-dimensional (3D) images according to example embodiments of the inventive concept.
Figure 2:
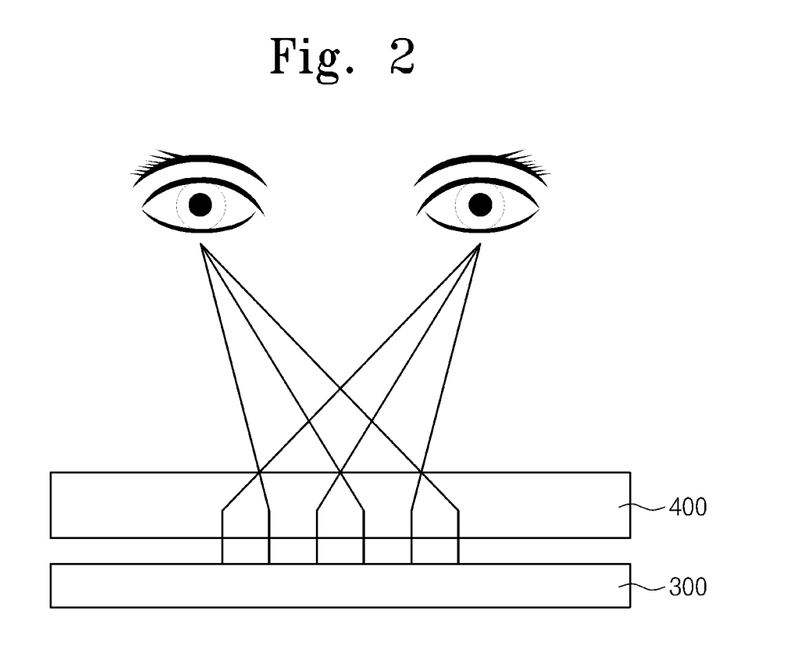
FIG. 2 is a schematic diagram illustrating a method for forming an image display apparatus capable of displaying two-dimensional (2D) and three-dimensional (3D) images according to example embodiments of the inventive concept.

FIGS. 1 and 2, respectively, are schematic diagrams illustrating a structure of an image display apparatus and methods of forming two-dimensional (2D) and three-dimensional (3D) images using the same, according to example embodiments of the inventive concept.

Referring to FIGS. 1 and 2, an image display apparatus may include a display panel 300 displaying images and a switching panel 400 provided on a surface of the display panel 300, to which the images are displayed. The display panel 300 and the switching panel 400 may be operated in two-dimensional (2D) or three-dimensional (3D) mode.

The display panel 300 may be one of various display apparatus, such as a plasma display panel (PDP), a liquid crystal display (LCD), and an organic light emitting display (OLED). Although not shown, the display panel 300 may include a plurality of pixels two-dimensionally arranged to display images. The display panel 300 may be configured to display planar images during a two-dimensional mode, and may be configured to alternately display images associated with several visual fields (e.g., images for right and left eyes), in a spatial or temporal division manner during a three-dimensional mode. For example, when the display panel 300 is operated in the three-dimensional mode, right eye images for the right eye and left eye images for the left eye may be alternately displayed at every column of pixels.

The switching panel 400 may allow the image displayed by the display panel 300 to transmit therethrough intact in the two-dimensional mode and to divide the image into corresponding visual fields, in the three-dimensional mode. For example, when in the three-dimensional mode, the switching panel 400 may be configured in such a way that each of multiview images (e.g., including the right eye and left eye images) displayed by the display panel 300 projected onto a corresponding one of the visual fields, using optical diffraction and refraction phenomena.

When the display panel 300 and the switching panel 400 are operated in the two-dimensional mode, the same image falls on the left and right eyes, as shown in FIG. 1, and this allows the viewer to perceive the image as a two-dimensional image. When the display panel 300 and the switching panel 400 are operated in the three-dimensional mode, the switching panel 400 may refract the image from the display panel 300 in such a way that each fraction of the image falls on the corresponding one of the visual fields (e.g., the left and right eyes) as shown in FIG. 2, and this allows the viewer to perceive the image as a three-dimensional image.

Figure 3:
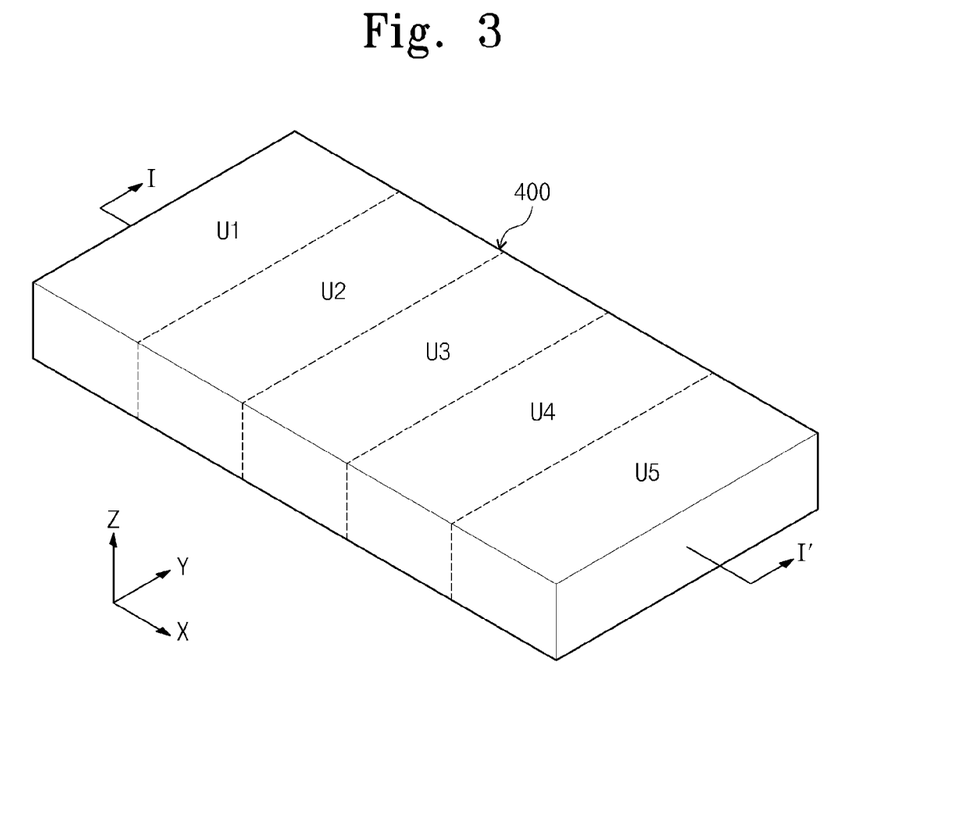
FIG. 3 is a perspective view schematically illustrating a switching panel of an image display apparatus according to example embodiments of the inventive concept.
Figure 4:
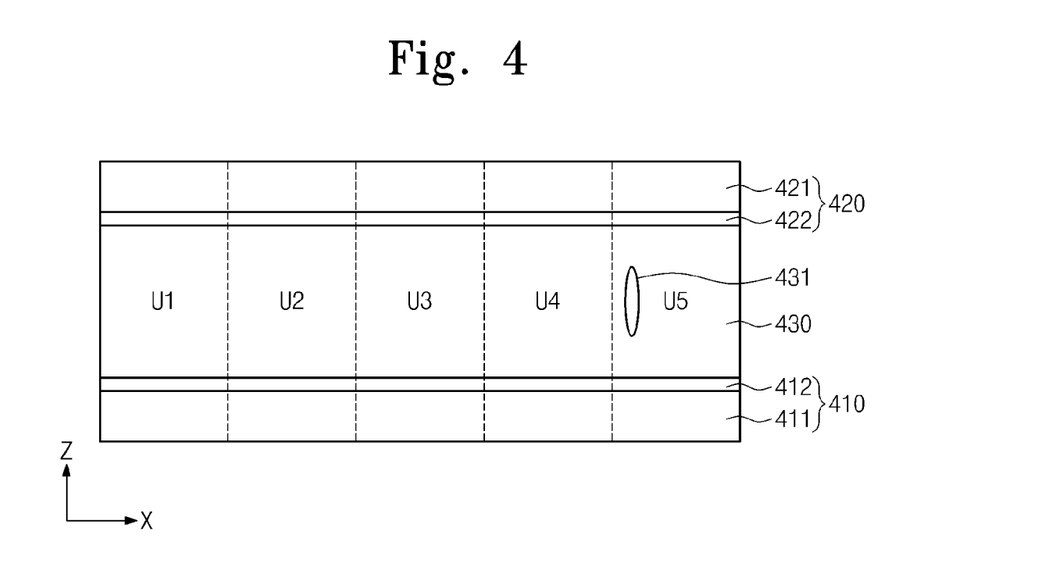
FIG. 4 is a sectional view of the switching panel taken along a line I-I' of FIG. 3.

FIG. 3 is a perspective view schematically illustrating a switching panel of an image display apparatus according to example embodiments of the inventive concept, and FIG. 4 is a sectional view of the switching panel taken along a line I-I' of FIG. 3.

Referring to FIGS. 3 and 4, the switching panel 400 may include a plurality of unit devices U1-U5 arranged along the x-axis direction. Each unit device U1-U5 may cover N view points of the display panel 300 (where N is a positive integer). Each viewpoint may be associated with a corresponding one of the pixels. For example, each unit device U1-U5 may cover nine view points.

The switching panel 400 may include first and second substrates 410 and 420, which are made of an insulating material (e.g., glass or plastic) and face each other, and a liquid crystal layer 430 interposed between the first and second substrates 410 and 420. A polarizer (not shown) may be provided on an outer surface of either or each of the first and second substrates 410 and 420.

The first substrate 410 may include a first base substrate 411 and a first electrode layer 412 provided on the first base substrate 411. The second substrate 420 may include a second base substrate 421 and a second electrode layer 422 provided on the second base substrate 421. The first and second electrode layers 412 and 422 may be formed of a transparent conductive material (e.g., indium tin oxide (ITO) or indium zinc oxide (IZO)).

One of the first and second electrode layers 412 and 422 may be patterned in such a way that a plurality of electrodes is disposed in each of the unit devices U1-U5, and the other may be provided in the form of a single electrode.

The liquid crystal layer 430 may include liquid crystal molecules 431 having a vertical orientation. The first and second electrode layers 412 and 422 may be applied with voltages producing an electric field to the liquid crystal layer 430 and thereby controlling arrangement of the liquid crystal molecules 431.

The switching panel 400 may be operated in a 2D or 3D mode, depending on the voltages applied to the first and second electrode layers 412 and 422. For example, in the case where there is no voltage applied to the first and second electrode layers 412 and 422, the switching panel 400 may be operated in the 2D mode, and in the case where different voltages are applied to the first and second electrode layers 412 and 422, respectively, the switching panel 400 may be operated in the 3D mode.

Figure 5:
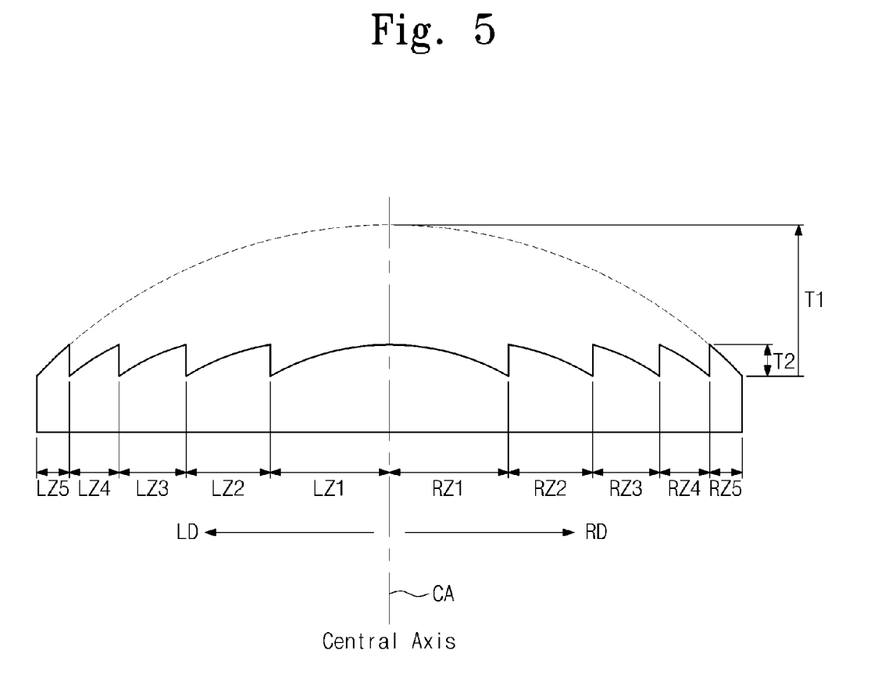
FIG. 5 is a sectional view illustrating a shape of a unit device of FIG. 3 and a phase delay thereof according to example embodiments of the inventive concept.

FIG. 5 is a sectional view illustrating a shape of a unit device of FIG. 3 and a phase delay thereof. According to some exemplary embodiments of the present invention, the unit devices U1-U5 may be provided to have the same structure, and thus, in order to avoid redundancy, one unit device will be exemplarily described with reference to FIG. 5. The remaining ones of the unit devices may be configured to have the same features as that of FIG. 5.

Referring to FIGS. 3 and 5, the switching panel 400 may include a plurality of unit devices U1-U5. The unit devices U1-U5 may be periodically or regularly arranged along a specific direction (e.g., an x-axis direction) parallel to one side of the switching panel 400. In the switching panel 400, positions of the unit devices U1-U5 may be invariant or be time-dependently changed.

Accordingly, when the liquid crystal layer 430 is angled, each unit device U1-U5 may have a variation in phase difference, similar to that of Fresnel lens. For example, each of the unit devices U1-U5 may have refractive regions, whose boundaries are located at portions having a discontinuous phase, when a desired ideal phase delay surface is divided by 2·n·π (where n is a positive integer), and thereby serving as a Fresnel lens. In example embodiments, the ideal phase delay surface may be a surface of a convex lens, a spherical lens, a hybrid lens, and so forth.

The Fresnel lens may have a second thickness T2 that is smaller to a thickness (hereinafter, referred to as a first thickness T1) of the ideal phase delay surface of a convex lens. By providing the switching panel 400 serving as the Fresnel lens, it is possible to achieve a cell gap of 1/K, which is smaller than that in the case of providing a switching panel serving as the convex lens. Here, K is a positive integer corresponding to n/2, and n is the number of circles contained in the Fresnel lens.

Based on the dividing of the ideal phase delay surface, each of the unit devices U1-U5 may be sectioned into a plurality of refractive regions RZ1, RZ2, RZ3, RZ4, RZ5, LZ1, LZ2, LZ3, LZ4, and LZ5. The right refractive regions RZ1, RZ2, RZ3, RZ4, and RZ5 and the left refractive regions LZ1, LZ2, LZ3, LZ4, and LZ5 may be formed to have mirror symmetry with respect to a plane including a central axis CA, for example, as shown.

Each of the refractive regions RZ1, RZ2, RZ3, RZ4, RZ5, LZ1, LZ2, LZ3, LZ4, and LZ5 may have a radius curvature equal to that of a corresponding one of concentric circles, which are disposed in such a way that a space between adjacent ones thereof decreases with increasing distance from the central axis CA, for example, as shown, and in this way the Fresnel lens may be formed.

Further, as shown in FIG. 5, widths (hereinafter, referred as to pitches) of the right refractive regions RZ1, RZ2, RZ3, RZ4, and RZ5 may decreases with increasing distance in a rightward direction RD from the central axis CA, and pitches of the left refractive regions LZ1, LZ2, LZ3, LZ4, and LZ5 may decreases with increasing distance in a leftward direction LD opposite the right direction RD from the central axis CA.

According to exemplary embodiments of the present invention, as shown in FIG. 5, each of the unit devices U1-U5 may be configured to include five refractive regions provided at each of the left and right sides of the central axis CA. Example embodiments of the inventive concepts may not be limited thereto and any number of refractive regions may be provided.

As shown in FIG. 5, in each unit device U1-U5, the refractive regions RZ1, RZ2, RZ3, RZ4, RZ5, LZ1, LZ2, LZ3, LZ4, and LZ5 may be configured in such a way that a phase delay thereof increases with decreasing distance from the central axis CA. Further, each unit device U1-U5 may refract light passing through each of the unit devices U1-U5 to focus the light on a specific position by optical effects (e.g., diffraction, constructive interference, and destructive interference).

Figure 6:
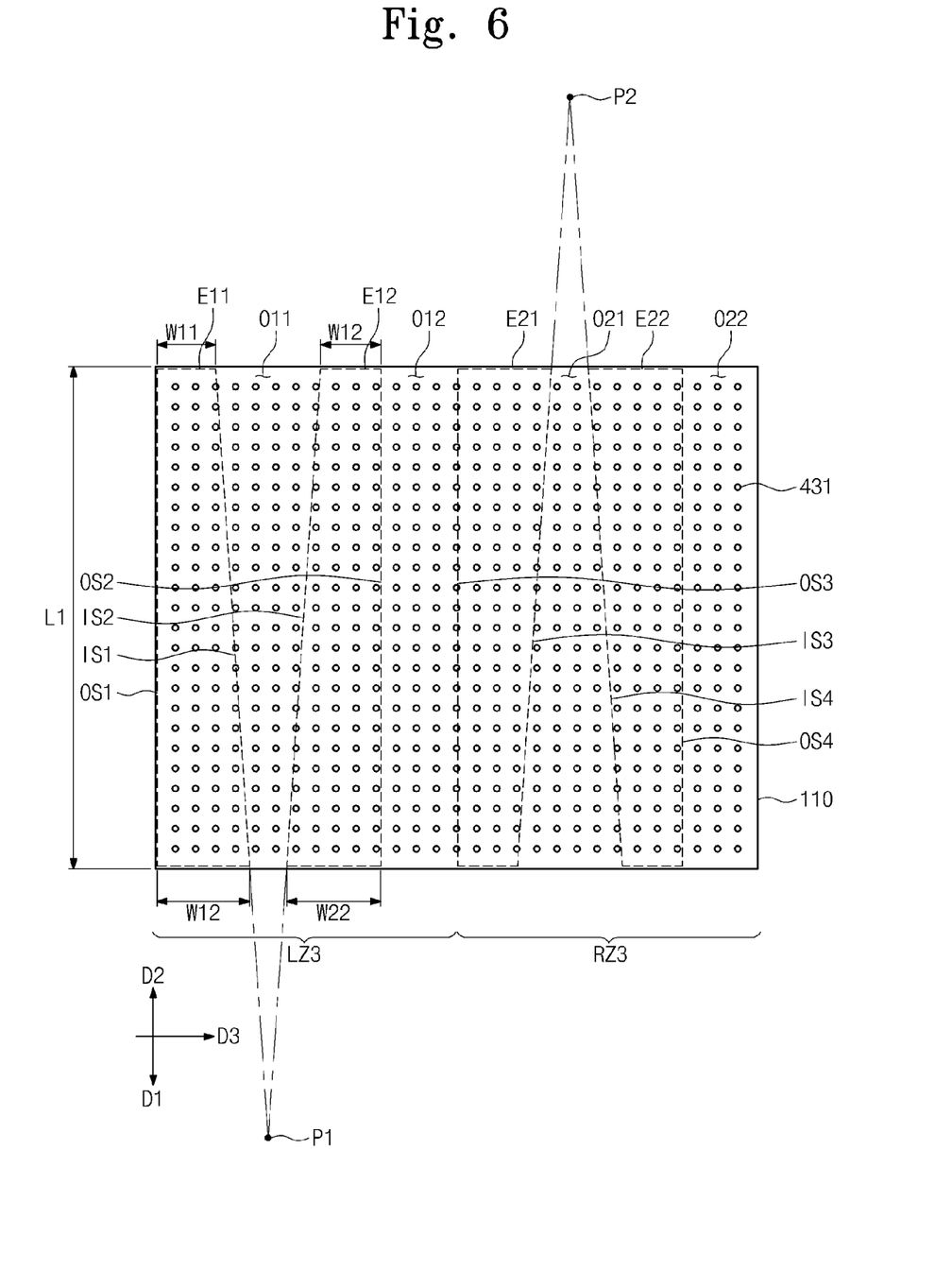
FIG. 6 is a plan view illustrating a first electrode layer related to left and right refractive regions according to example embodiments of the inventive concept.
Figure 7:
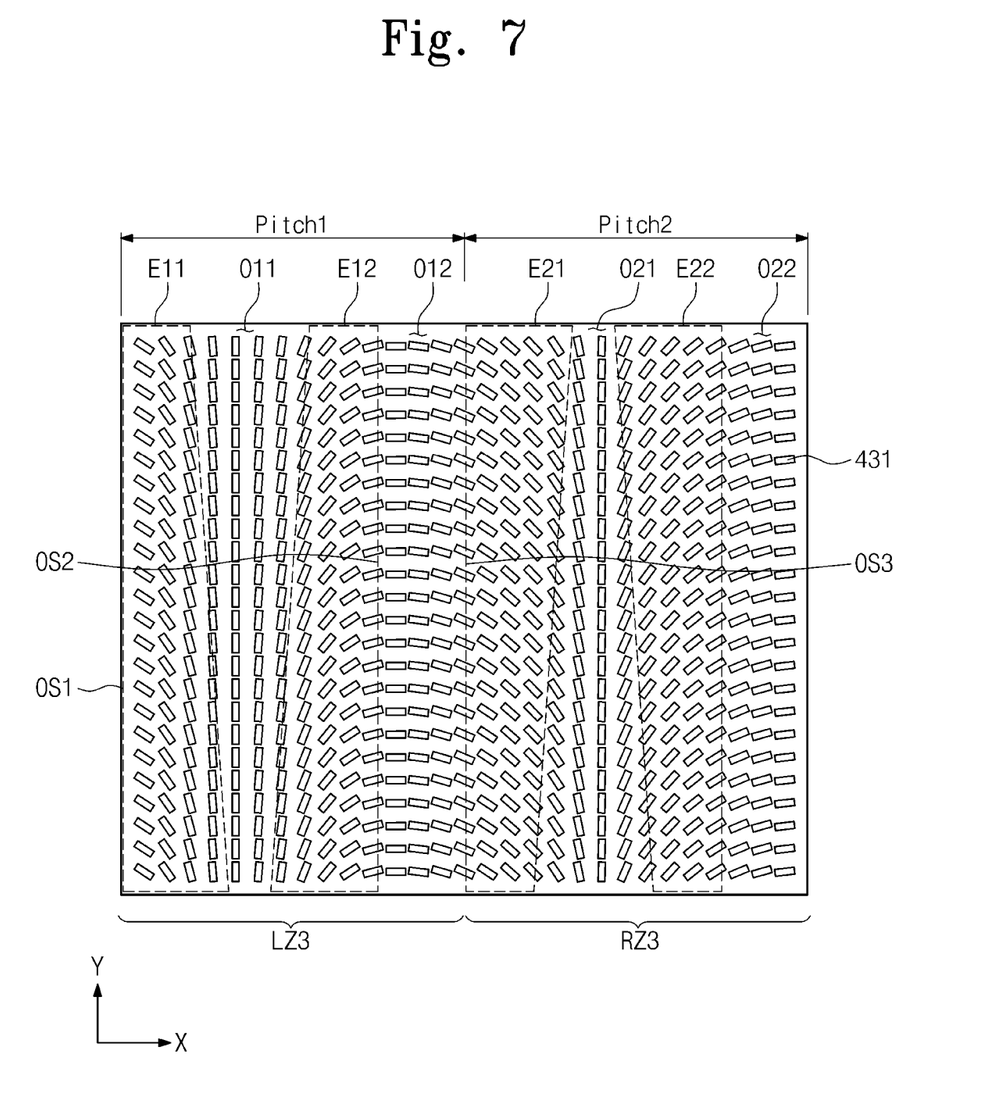
FIG. 7 is a diagram illustrating orientations of liquid crystals in a 3D mode operation according to example embodiments of the inventive concept.

FIG. 6 is a plan view illustrating a portion of the first electrode layer corresponding to the left and right refractive regions, and FIG. 7 is a diagram illustrating orientations of the liquid crystals in the 3D mode operation. Hereinafter, the third left and right refractive regions LZ3 and RZ3, having mirror symmetry with respect to each other, will be exemplarily described with reference to FIGS. 6 and 7. As described above, the third left and right refractive regions LZ3 and RZ3 may be provided at left and right sides, respectively, of the central axis CA, but in order to reduce complexity in the drawings and to provide better understanding of example embodiments of the inventive concept, the third left and right refractive regions LZ3 and RZ3 are illustrated to be adjacent to each other in FIGS. 6 and 7.

FIGS. 6 and 7 show a planar structure of a portion of the first electrode layer 412 (shown in FIG. 4), which may be disposed on the first base substrate 411 to correspond to the third left refractive region LZ3 and the third right refractive region RZ3. The first electrode layer 412 may include first and second electrodes E11 and E12 provided on the third left refractive region LZ3 and third and fourth electrodes E21 and E22 provided on the third right refractive region RZ4. For example, as shown in FIGS. 6 and 7, two electrodes applied with the same voltage may be provided on each refractive region.

Two opposite inner sides (hereinafter, referred as to first and second inner sides IS1 and IS2) of the first and second electrodes E11 and E12 may be angled in such a way that extending lines therefrom converge on a first position P1. Further, a distance between the first and second inner sides IS1 and IS2 of the first and second electrodes E11 and E12 may decrease with decreasing distance from the first position P1 or toward a first direction D1.

A distance between two outer sides (hereinafter, referred as to first and second outer sides OS1 and OS2) of the first and second electrodes E11 and E12 may be uniform. For example, the first and second outer side OS1 and OS2 may be parallel to each other and extended to the first direction D1. As a result, each of the first and second electrodes E11 and E12 may have an increasing width along the first direction D1.

The first electrode E11 may have a length of 'L1', a minimum width of 'W11', and a maximum width of 'W12', where the length L1 is measured along the first direction D1 and the widths W11 and W12 are measured along a third direction D3 perpendicular to the first direction D1. In this case, the first electrode E11 may be configured in such a way that a ratio of '|W12-W11|' to 'L1' thereof may be in a range from about 1/100 to about 2/100. When viewed in plan view, a slope of the first inner side IS1 may be dependent on the ratio |W12-W11|/L1. Similar to the first electrode E11, the second inner side IS2 of the second electrode E12 may have a slope determined by a ratio of '|W22-W21|' to 'L2' of the second electrode E12.

The first and second electrodes E11 and E12 may be disposed spaced apart from each other on the same plane, and thus, a first opening O11 may be formed between the first and second electrodes E11 and E12. Further, a second opening O12 may be formed adjacent to the first outer side OS1 of the first electrode E11 or the second outer side OS2 of the second electrode E12. FIGS. 6 and 7 illustrate exemplarily the second opening O12 provided adjacent to the second outer side OS2 of the second electrode E12, but example embodiments of the inventive concept are not limited thereto.

The first opening O11 may have an area ranging from one-half to one times a sum of areas of the first and second electrodes E11 and E12. Further, the second opening O12 may be formed to have a minimum size that can practically be obtained by available processing approaches. For example, the second opening O12 may have a width of about 3-4 μm.

Two opposite inner sides (hereinafter, referred as to third and fourth inner sides IS3 and IS4) of the third and fourth electrodes E21 and E22 may be angled in such a way that extending lines therefrom converge on a second position P2. Further, a distance between the third and fourth inner sides IS3 and IS4 of the third and fourth electrodes E21 and E22 may decrease toward the second direction D2 opposite to the first direction D1.

A distance between two outer sides (hereinafter, referred to as a third outer side OS3 and a fourth outer side OS4) of the third and fourth electrodes E21 and E22 may be uniform. For example, the third and fourth outer sides OS3 and OS4 may be parallel to each other and may also be parallel to the second direction D2. As a result, each of the third and fourth electrodes E21 and E22 may have an increasing width along the second direction D2.

The third and fourth electrodes E21 and E22 may be disposed spaced apart from each other on the same plane, and thus, a third opening O21 may be formed between the third and fourth electrodes E21 and E22. Further, a fourth opening O22 may be formed adjacent to the third outer side OS3 of the third electrode E21 or the fourth outer side OS4 of the fourth electrode E22. FIGS. 6 and 7 illustrate exemplarily the fourth opening O22 provided adjacent to the fourth outer side OS4 of the fourth electrode E22, but example embodiments of the inventive concept are not limited to this particular arrangement.

The third and fourth inner sides IS3 and IS4 may have slopes given in a similar manner as that of the first and second inner sides IS1 and IS2, and the third and fourth openings O21 and O22 may have areas given in a similar manner as that of the first and second openings O11 and O12.

As shown in FIG. 7, a pitch, Pitch1, of the third left refractive region LZ3 may be defined as a distance from the first outer side OS1 of the first electrode E11 to the third outer side OS3 of the third electrode E21. As shown in FIG. 5, since distances between the third left and right refractive regions LZ3 and RZ3 and the central axis CA are the same, the pitch Pitch1 of the third left refractive region LZ3 may be substantially the same as a pitch Pitch2 of the third right refractive region RZ4.

As shown in FIG. 6, in the case where a voltage is not applied to the first and second electrode layers 412 and 422, the liquid crystal molecules 431 may be oriented to be perpendicular to a plane of the first base substrate 411. Thereafter, as shown in FIG. 7, in the case where the first and second electrode layers are applied with voltages, the liquid crystal molecules 431 may be oriented along an equipotential surface formed by the first to fourth electrodes E11-E22. A trapezoid-shaped equipotential surface tapering toward the first direction D1 may be formed between the first and second electrodes E11 and E12 to orient or lay down the liquid crystal molecules 431 toward the first direction D1. Further, a trapezoid-shaped equipotential surface tapering toward the second direction D2 may be formed between the third and fourth electrodes E21 and E22 to orient or lay down the liquid crystal molecules 431 toward the second direction D2.

Accordingly, since the orientation direction of the liquid crystal molecules 431 is controlled using the first to fourth electrodes E11-E22 having the tapered shape, it is possible to omit a pre-tilt process for initially orientating the liquid crystal molecules.

Figure 8:
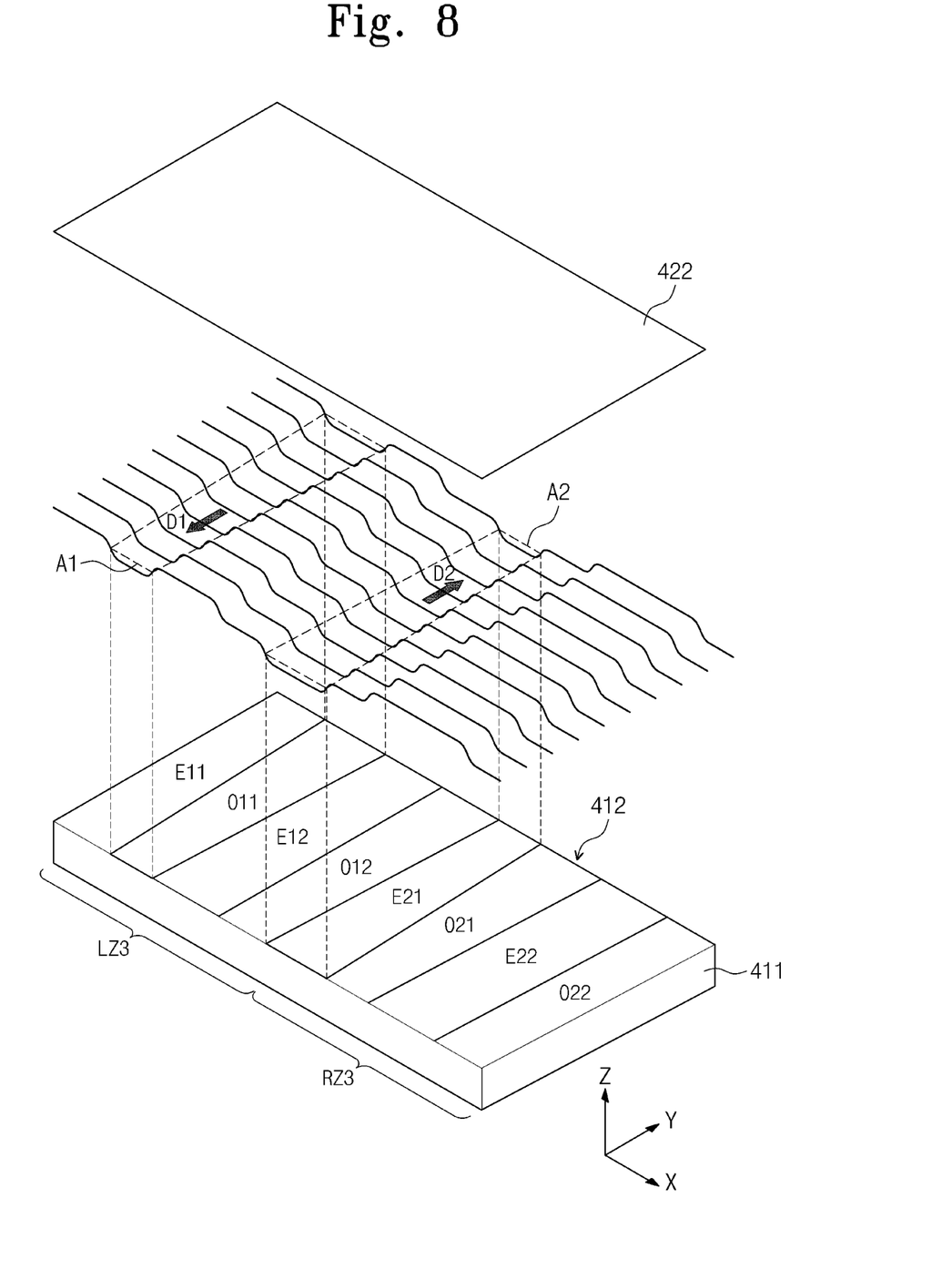
FIG. 8 is a diagram showing an equipotential surface formed between first and second electrode layers according to example embodiments of the inventive concept.

FIG. 8 is a diagram showing an equipotential surface formed between first and second electrode layers according to exemplary embodiments of the present invention.

Referring to FIG. 8, the second electrode layer 422 may be applied with a reference voltage, and the first and second electrodes E11 and E12 may be applied with an operation voltage. According to some exemplary embodiments of the present invention, the first and second electrodes E11 and E12 may be applied with the same operation voltage, and thus, the equipotential surface A1 may be positioned at the same height between the first and second electrode layers 412 and 422, in regions formed with the first and second electrodes E11 and E12.

A gap region (e.g., the first opening O11) between the first and second electrodes E11 and E12 may be shaped like a trapezoidal shape tapering toward the first direction D1. Thus, on a region corresponding to the first opening O11, an equipotential surface A1 may be formed at a level lower than those of the first and second electrodes E11 and E12, and, when viewed in plan view, it may have a trapezoidal shape.

The first and second electrodes E11 and E12 may be applied with a different operation voltage from that applied to the third and fourth electrodes E21 and E22. In this case, a level of an equipotential surface may be different between on a region provided with the first and second electrodes E11 and E12 and on other region provided with the third and fourth electrodes E21 and E22.

A gap region (e.g., the second opening O21) between the third and fourth electrodes E21 and E22 may be shaped like a trapezoidal shape tapering toward the second direction D2. Thus, on a region corresponding to the second opening O21, an equipotential surface A2 may be formed at a height lower than those of the third and fourth electrodes E21 and E22, and when viewed in plan view, it may have a trapezoidal shape.

Between the first and second electrodes E11 and E12, the equipotential surface A1 may be formed to orient or lay down the liquid crystal molecules 431 toward the first direction D1. Between the third and fourth electrodes E21 and E22, the equipotential surface A2 may be formed to orient or lay down the liquid crystal molecules 431 toward the second direction D2.

Figure 9A:
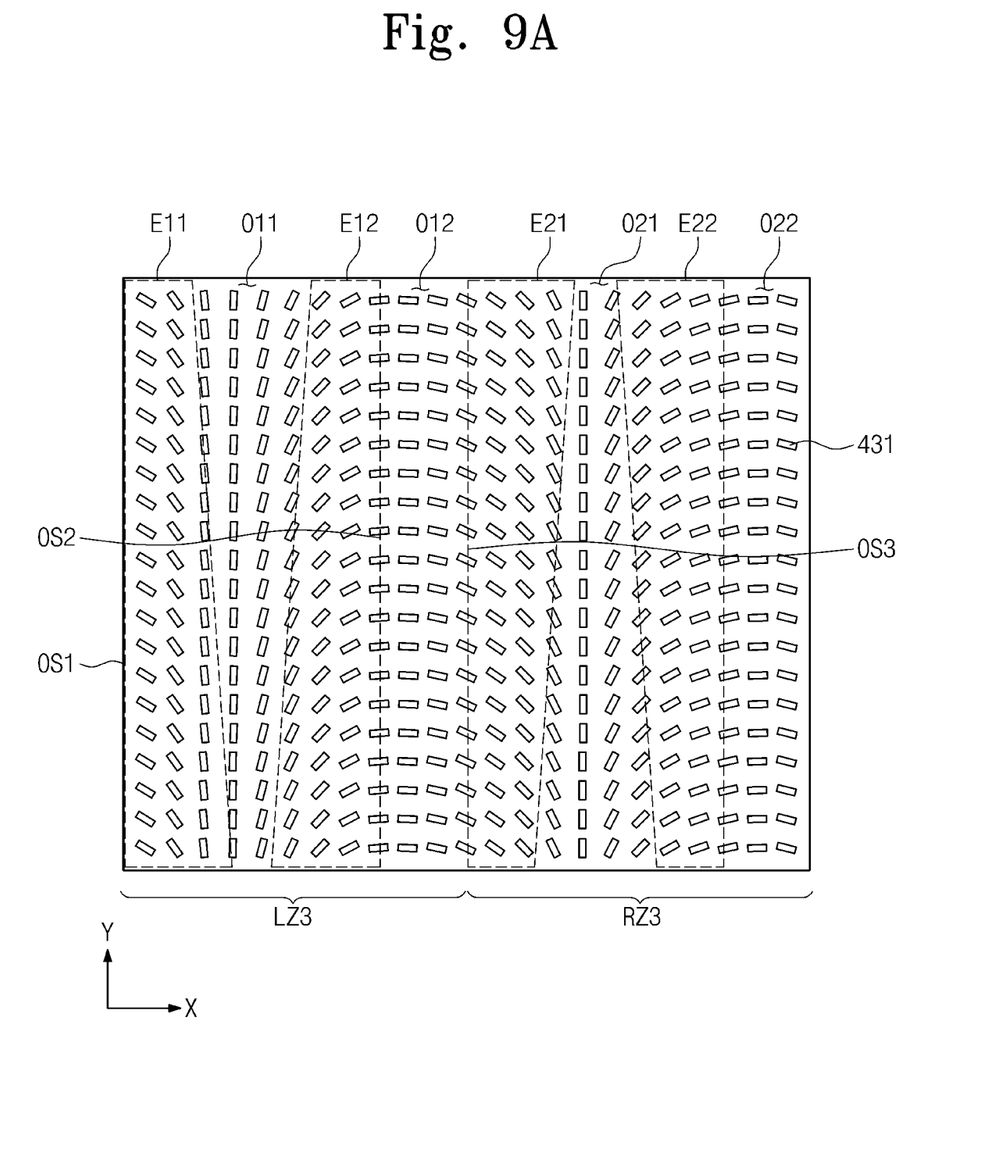
FIG. 9A is a diagram illustrating orientations of the liquid crystals, when a ratio of '|W12-W11|' to 'L1' is about 1/100 according to example embodiments of the inventive concept.
Figure 9B:
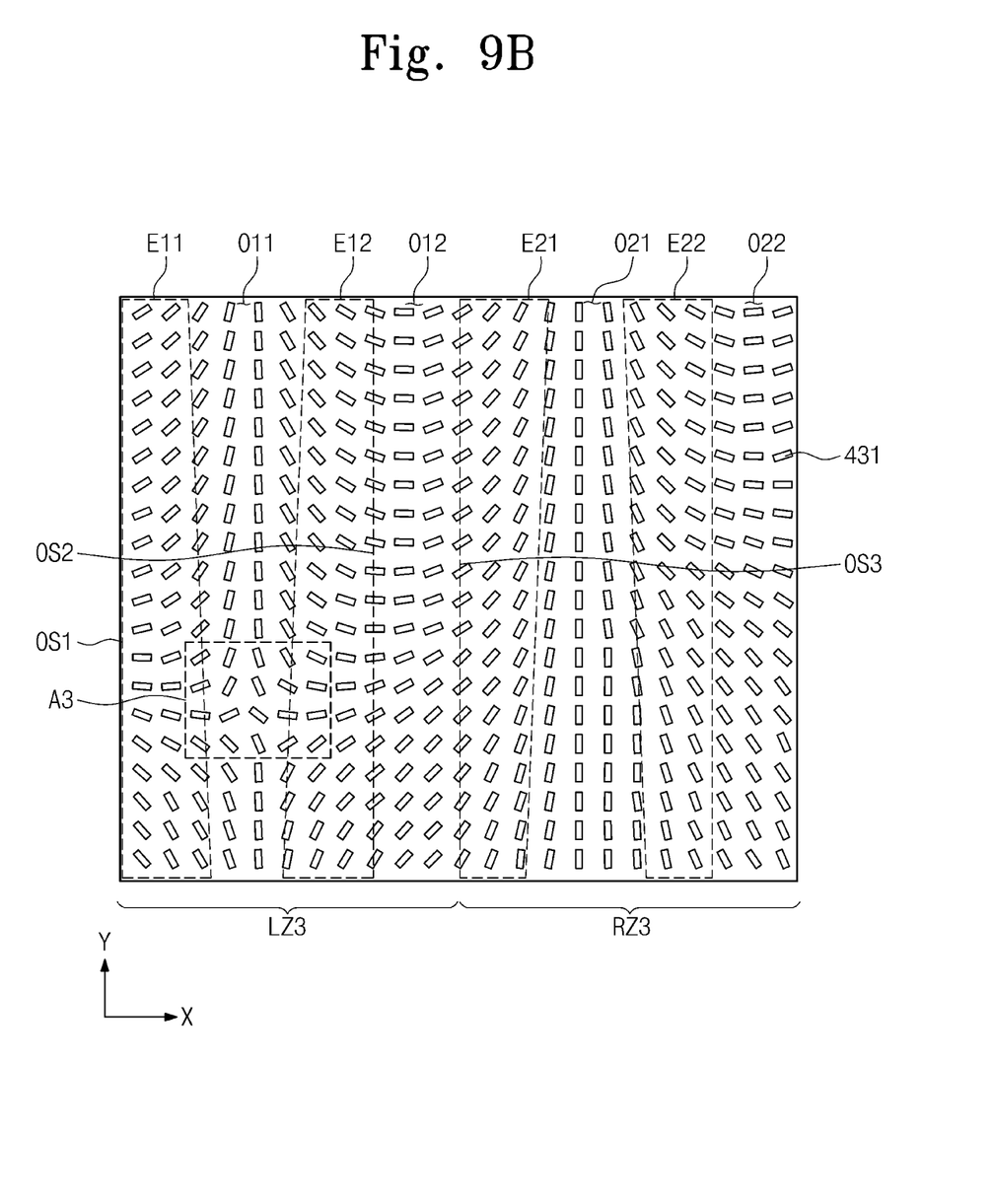
FIG. 9B is a diagram illustrating orientations of the liquid crystals, when the ratio of '|W12-W11|' to 'L1' is about 1/600 according to example embodiments of the inventive concept.

FIG. 9A is a diagram illustrating orientations of the liquid crystals, when a ratio, |W12-W11|/L1 is about 1/100, and FIG. 9B is a diagram illustrating orientations of the liquid crystals, when the ratio, |W12-W11|/L1 is about 1/600.

Referring to FIGS. 9A and 9B, when the ratio |W12-W11|/L1 is about 1/100, the liquid crystal molecules have a normal orientation, during the 3D mode operation. However, when the ratio |W12-W11-/L1 is about 1/600, the liquid crystal molecules at a first region A3 have an abnormal orientation, during the 3D mode operation.

For example, when each of the first and second inner sides IS1 and IS2 of the first and second electrodes E11 and E12 has a slope smaller than 1/600, it may be difficult to achieve the normal orientation of the liquid crystal molecules between the first and second electrodes E11 and E12.

In example embodiments, each of the first and second inner sides IS1 and IS2 of the first and second electrodes E11 and E12 may be configured to have a slope capable of achieving the normal orientation of the liquid crystal molecules.

Figure 10:
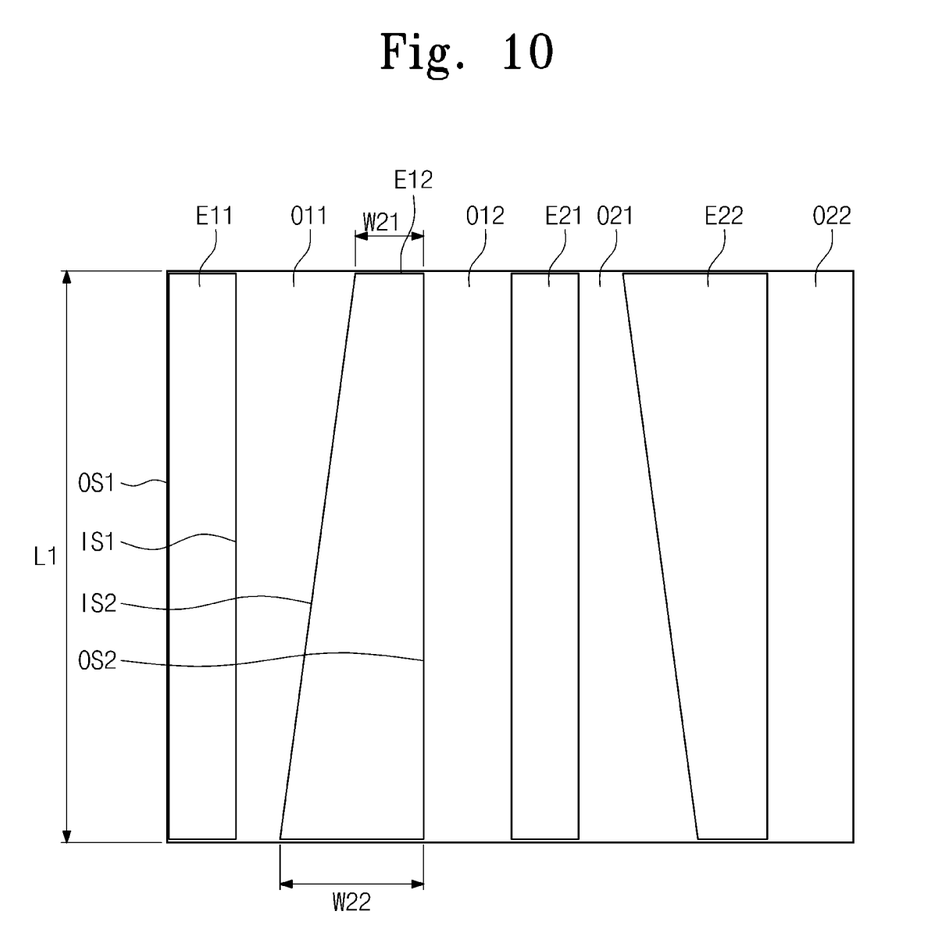
FIG. 10 is a plan view showing first to fourth electrodes, according to an example embodiment of the inventive concept.

FIG. 10 is a plan view showing first to fourth electrodes, according to example embodiments of the inventive concept. In the following description of FIG. 10, previously described elements may be identified by a similar or identical reference number and a description thereof may be omitted for the sake of brevity.

Referring to FIG. 10, the first electrode E11 may be provided in such a way that the first inner and outer sides IS1 and OS1 thereof are parallel to each other. For example, the first electrode E11 may have a rectangular shape. Accordingly, a width of the first electrode E11 may be constant along the first direction D1. The second electrode E12 may be provided in such a way that the second inner side IS2 thereof is angled toward the first inner side IS1 and the second outer side OS2 thereof is parallel to the first outer side OS1. For example, the second electrode E12 may have a trapezoidal shape. Accordingly, a width of the second electrode E12 may increase along the first direction D1.

Further, a distance between the first and second outer sides OS and OS2 of the first and second electrodes E11 and E12 may be uniform. The second electrode E12 may have a length of 'L2', as shown in FIG. 6, a minimum width of 'W2', a maximum width of 'W22', where the length L2 is measured along the first direction D1 and the widths W21 and W22 are measured along the third direction D3 perpendicular to the first direction D1. In this case, the second electrode E12 may be configured in such a way that a ratio of |W21-W22|/L2 ranges from about 1/100 to 2/100.

The first and second electrodes E11 and E12 may be disposed spaced apart from each other on the same plane, and thus, the first opening O11 may be formed between the first and second electrodes E11 and E12. Further, the second opening O12 may be formed adjacent to the first outer side OS1 of the first electrode E11 or the second outer side OS2 of the second electrode E12. FIGS. 6 and 7 illustrate exemplarily the second opening O12 provided adjacent to the second outer side OS2 of the second electrode E12, but example embodiments of the inventive concept may not be limited thereto.

The first opening O11 may have an area ranging from one-half to one times a sum of areas of the first and second electrodes E11 and E12. Further, the second opening O12 may be formed to have a minimum size that can practically be obtained by available processing approaches. For example, the second opening O12 may be formed to have a width of about 3-4 μm.

Figure 11:
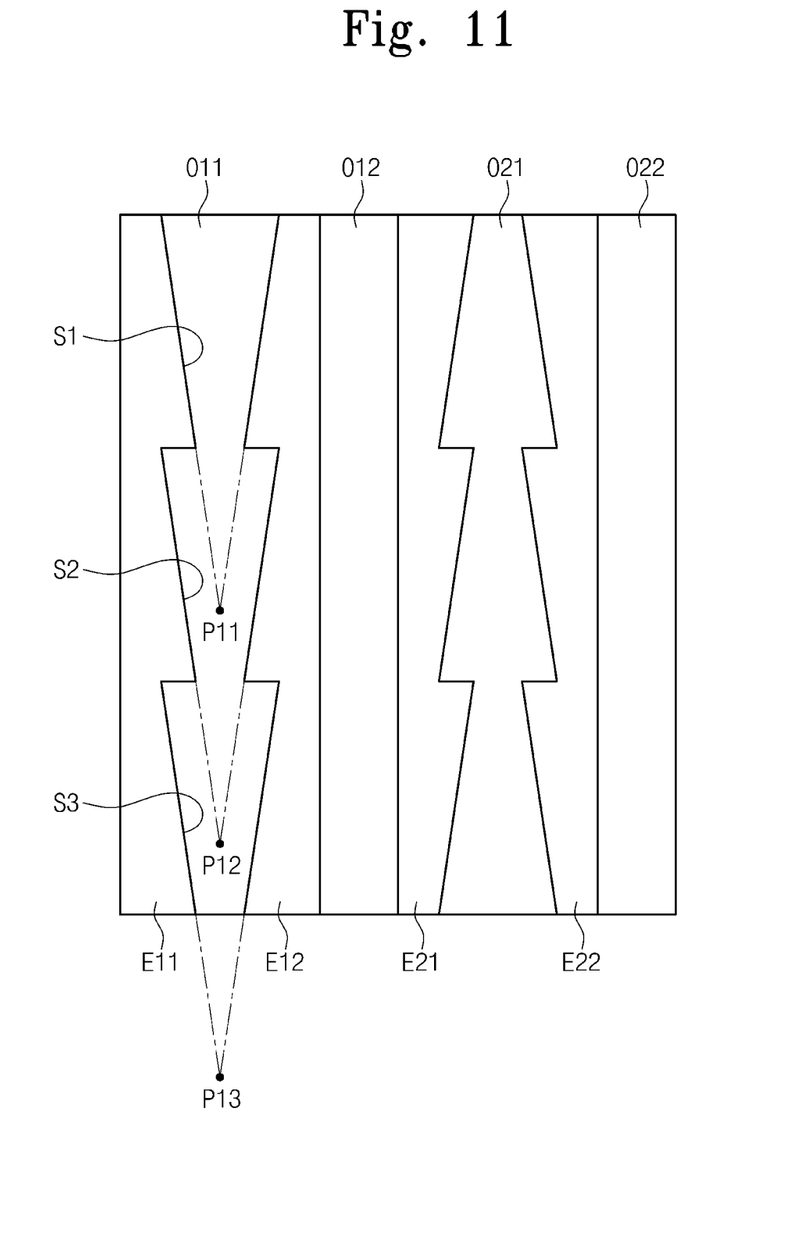
FIG. 11 is a plan view showing first to fourth electrodes, according to an example embodiment of the inventive concept.

FIG. 11 is a plan view showing first to fourth electrodes, according to exemplary embodiments of the inventive concept.

Referring to FIG. 11, the first and second electrodes E11 and E12 may be formed in such a way that the first and second inner sides IS1 and IS2 thereof converge on the first positions P11-P13, respectively. The first and second inner sides IS1 and IS2 may include a plurality of angled portions S1-S3 converging on the first positions P11-P13, respectively, and the angled portions S1-S3 may be sequentially arranged toward the first direction D1.

The first and second electrodes E11 and E12 may be disposed spaced apart from each other on the same plane, and thus, the first opening O11 may be formed between the first and second electrodes E11 and E12. The second opening O12 may be formed adjacent to the second outer side OS2 of the second electrode E12.

The third and fourth electrodes E21 and E22 may be configured to have a structure similar to the first and second electrodes E11 and E12, and for the sake of brevity, a detailed description thereof may be omitted below.

Figure 12:
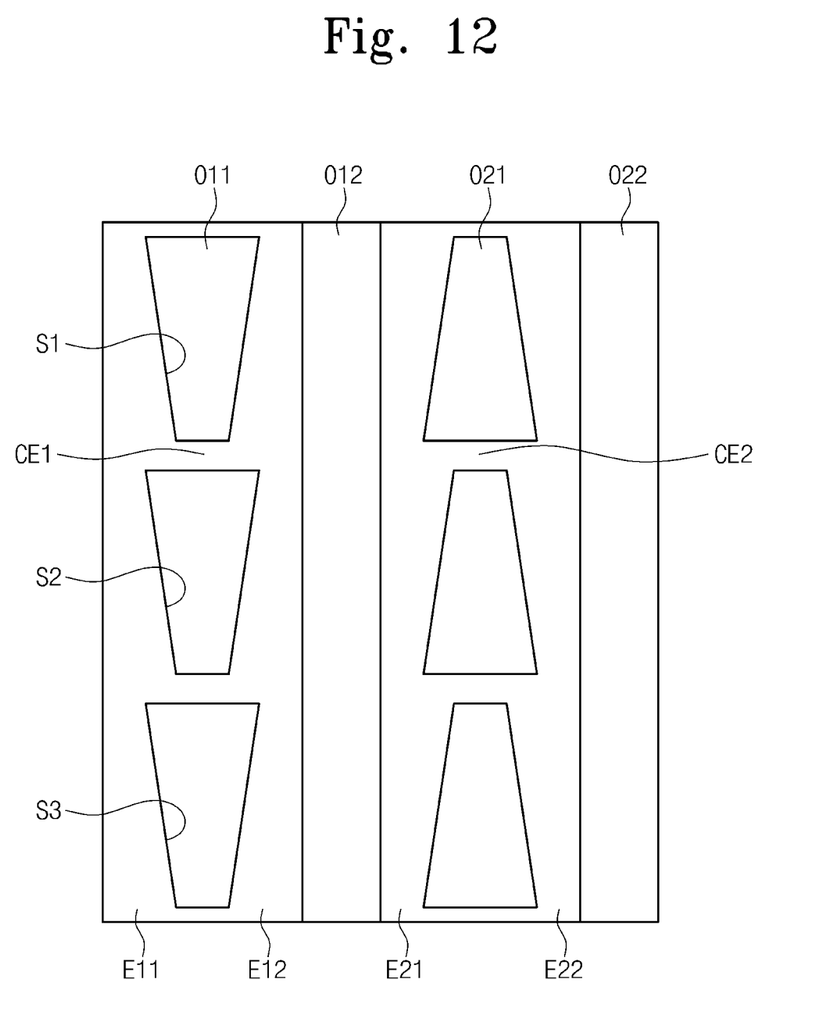
FIG. 12 is a plan view showing first to fourth electrodes, according to an example embodiment of the inventive concept.

FIG. 12 is a plan view showing first to fourth electrodes, according to exemplary embodiments of the inventive concept.

Referring to FIG. 12, the first and second electrodes E11 and E12 may be formed in such a way that the first and second inner sides IS1 and IS2 thereof converge on the first positions P11-P13, respectively. The first and second inner sides IS1 and IS2 may include a plurality of angled portions S1-S3 converging on the first positions P11-P13, respectively, and the angled portions S1-S3 may be sequentially arranged toward the first direction D1.

A plurality of first connection electrodes CE1 may be provided between the first and second electrodes E11 and E12 to connect the first and second electrodes E11 and E12 electrically to each other, and a plurality of second connection electrodes CE2 may be provided between the third and fourth electrodes E21 and E22 to connect the third and fourth electrodes E21 and E22 electrically to each other.

Accordingly, a plurality of first openings O11 arranged along the first direction D1 may be provided between the first and second electrodes E11 and E12, and a plurality of third openings O21 arranged along the second direction D2 may be provided between the third and fourth electrodes E21 and E22.

Each of the first openings O11 may have a decreasing width toward the first direction D1 or a trapezoidal shape, and each of the third openings O21 may have a decreasing width toward the second direction D2 or a trapezoidal shape.

Although not shown, each of the left and right refractive regions RZ1, RZ2, RZ3, RZ4, RZ5, LZ1, LZ2, LZ3, LZ4, and LZ5 may have an increasing pitch with decreasing distance from the central axis CA. In this case, each of the first and second electrodes E11 and E12 may have an increasing width with decreasing distance from the central axis CA, and each of the third and fourth electrodes E21 and E22 may have an increasing width with decreasing distance from the central axis CA.

Further, the slopes of the first and second inner sides IS1 and IS2 of the first and second electrodes E11 and E12 and the slopes of the third and fourth inner sides IS3 and IS4 of the third and fourth electrodes E21 and E22 may increase with decreasing distance from the central axis CA.

In the case where the slopes of the first and second inner sides IS1 and IS2 and the slopes of the third and fourth inner sides IS3 and IS4 are uniform regardless of the distance from the central axis CA, a way of controlling the spaces between the first and second inner sides IS1 and IS2 and between the third and fourth inner sides IS3 and IS4 or controlling voltages applied to the first to fourth electrodes E11, E12, E21 and E22 may be used.

According to example embodiments of the inventive concept, the first and second electrodes may have structures capable of controlling a profile of an equipotential surface, and thus, liquid crystal molecules can be orientated along a desired direction. Accordingly, a pre-tilt process for initially orientating the liquid crystal molecules in the switching panel may be omitted, and thus, the fabrication process can be simplified.

While example embodiments of the inventive concepts have been particularly shown and described, it will be understood by one of ordinary skill in the art that variations in form and detail may be made therein without departing from the spirit and scope of the present disclosure.

What is claimed is:

1. An image display apparatus, comprising:
a display panel displaying an image; and
a switching panel configured to be operated in both a two-dimensional and a three-dimensional mode,
wherein the switching panel comprises, first and second substrates facing each other, a first electrode layer disposed on the first substrate, a second electrode layer disposed on the second substrate, and a liquid crystal layer interposed between the first and second substrates,
wherein one of the first and second electrode layers comprises first and second electrodes provided on a common plane, and a distance between the first and second electrodes on the common plane decreases along a first direction over an entire length of the first substrate.

2. The image display apparatus of claim 1, wherein the other the first and second electrode layers comprises third and fourth electrodes provided on a common plane, and a distance between the third and fourth electrodes on the common plane decrease along a second direction opposite to the first direction.

3. The image display apparatus of claim 1, wherein the first and second electrodes are disposed spaced apart from each other on the common plane and define an opening therebetween.

4. The image display apparatus of claim 3, wherein an equipotential surface shaped like a trapezoid is formed in the opening.

5. The image display apparatus of claim 3, wherein the opening has an area ranging from one-half to one times a sum of areas of the first and second electrodes.

6. The image display apparatus of claim 3, further comprising a connection electrode provided between the first and second electrodes and electrically connecting the first and second electrodes to each other, and wherein the connection electrode is divided into a plurality of portions by the opening.

7. The image display apparatus of claim 1, wherein the switching panel is configured to be operated in a two-dimensional mode when there is no voltage applied between the first and second electrode layers, and the switching panel is configured to be operated in a three-dimensional mode when a voltage is applied between the first and second electrode layers.

8. The image display apparatus of claim 1, wherein the liquid crystal layer comprises liquid crystal molecules having vertical orientation.

9. The image display apparatus of claim 1, wherein the first and second electrode layers of the switching panel form a plurality of unit devices therebetween, and each of the unit devices is sectioned into a plurality of refractive regions.

10. The image display apparatus of claim 9, wherein pitches of the refractive regions decrease with increasing distance from a central axis of the corresponding unit device.

11. An imaged display apparatus, comprising:
a display panel displaying an image; and
a switching panel configured to be operated in both a two-dimensional and a three-dimensional mode,
wherein the switching panel comprises, first and second substrates facing each other, a first electrode layer disposed on the first substrate, a second electrode layer disposed on the second substrate; and a liquid crystal layer interposed between the first and second substrates,
wherein one of the first and second electrode layers comprises first and second electrodes provided on a common plane, and a distance between the first and second electrodes on the common plane decreases along a first direction,
wherein the other the first and second electrode layers comprises third and fourth electrodes provided on a common plane, and a distance between the third and fourth electrodes on the common plane decrease along a second direction opposite to the first direction, and
wherein the first and second electrodes taper towards the first direction, and the third and fourth electrodes taper towards the second direction.

12. The image display apparatus of claim 11, wherein the two inner sides of the first and second electrodes are slanted in such a way that lines extending therefrom converge on the first position, and a distance between two outer sides of the first and second electrodes is uniform, and the two inner sides of the third and fourth electrodes are slanted in such a way that lines extending therefrom converge on the second position, and a distance between two outer sides of the third and fourth electrodes is uniform.

13. The image display apparatus of claim 12, wherein each of the first and second electrodes has an increasing width toward the first direction, and each of the third and fourth electrodes has an increasing width toward the second direction.

14. The image display apparatus of claim 11, wherein one of the two inner side of the first and second electrodes is slanted in such a way that a line extending therefrom passes through the first position, and a distance between two outer sides of the first and second electrodes is uniform, and one of the two inner sides of the third and fourth electrodes is slanted in such a way that a line extending therefrom passes through the second position, and a distance between two outer sides of the third and fourth electrodes is uniform.

15. A display device, comprising:
a display panel; and
a switching panel disposed on the display panel, the switching panel comprising:
a first substrate having a first electrode layer disposed thereon;
a second substrate facing the first substrate and having a second electrode layer disposed thereon; and
a liquid crystal layer disposed between the first and second substrates,
wherein the switching panel is configured to be operable in first mode in which the liquid crystal layer is arranged to form a Fresnel lens and a second mode in which the liquid crystal layer is arranged to substantially un-alter the path of light transmitted therethough, and
wherein the first and second electrode layers form an equipotential surface having a shape of either a single trapezoid, a plurality of overlapping trapezoids arranged in a row, or two rows that are mirror images of each other, and
wherein the first and second electrode layers orient the liquid crystal layer to a desired pre-tilt angle.

16. The display device of claim 15, wherein the equipotential surface is formed between two coplanar electrodes disposed on either the first electrode layer or the second electrode layer.

17. The display device of claim 16, wherein the equipotential surface has a shape of a single trapezoid.

18. The display device of claim 15, wherein the equipotential surface has a shape of a plurality of partially overlapping trapezoids arranged in a row.

19. The display device of claim 15, wherein the equipotential surface includes two rows that are mirror images of each other.

* * * * *